United States Patent
Higuchi

(10) Patent No.: US 11,485,805 B2
(45) Date of Patent: Nov. 1, 2022

(54) POLY(METH)ACRYLATE, AND COATING COMPOSITION AND COATED ARTICLE CONTAINING SAME

(71) Applicant: SHIN-ETSU CHEMICAL CO., LTD., Tokyo (JP)

(72) Inventor: Koichi Higuchi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 305 days.

(21) Appl. No.: 16/627,263

(22) PCT Filed: Apr. 10, 2018

(86) PCT No.: PCT/JP2018/015040
§ 371 (c)(1),
(2) Date: Dec. 27, 2019

(87) PCT Pub. No.: WO2019/003563
PCT Pub. Date: Jan. 3, 2019

(65) Prior Publication Data
US 2020/0165364 A1    May 28, 2020

(30) Foreign Application Priority Data

Jun. 29, 2017 (JP) .............................. JP2017-127284

(51) Int. Cl.
| | |
|---|---|
| C08F 30/08 | (2006.01) |
| C08F 32/06 | (2006.01) |
| C09D 7/62 | (2018.01) |
| C08K 9/06 | (2006.01) |
| C08K 3/36 | (2006.01) |
| C09D 143/04 | (2006.01) |

(52) U.S. Cl.
CPC .............. C08F 30/08 (2013.01); C08F 32/06 (2013.01); C09D 7/62 (2018.01); C09D 143/04 (2013.01); C08K 3/36 (2013.01); C08K 9/06 (2013.01)

(58) Field of Classification Search
None
See application file for complete search history.

(56) References Cited

U.S. PATENT DOCUMENTS

| | | | | |
|---|---|---|---|---|
| 5,635,544 | A * | 6/1997 | Tamura ..................... | C09D 4/00 427/510 |
| 6,368,535 | B1 | 4/2002 | Katsoulis et al. | |
| 2005/0080154 | A1 | 4/2005 | Tabei | |
| 2007/0276059 | A1 | 11/2007 | Lewandowski et al. | |
| 2015/0005431 | A1 | 1/2015 | Tanabiki | |
| 2017/0015817 | A1 | 1/2017 | Yoda et al. | |
| 2017/0051114 | A1 | 2/2017 | Kusunoki et al. | |
| 2017/0198110 | A1 | 7/2017 | Higuchi et al. | |

FOREIGN PATENT DOCUMENTS

| | | |
|---|---|---|
| JP | 6-263809 A | 9/1994 |
| JP | 2001-64393 A | 3/2001 |
| JP | 2002-212500 A | 7/2002 |
| JP | 2003-306492 A | 10/2003 |
| JP | 2003-327626 A | 11/2003 |
| JP | 2004-323741 A | 11/2004 |
| JP | 2005-133073 A | 5/2005 |
| JP | 2005-255979 A | 9/2005 |
| JP | 2007-16215 A | 1/2007 |
| JP | 2008-506698 A | 3/2008 |
| JP | 2008-179693 A | 8/2008 |
| JP | 2010-215843 A | 9/2010 |
| JP | 2017-39885 A | 2/2017 |
| JP | 2017-511399 A | 4/2017 |
| KR | 10-2015-0146106 A | 12/2015 |
| WO | WO 2013/114750 A1 | 8/2013 |
| WO | WO 2015/152289 A1 | 10/2015 |

OTHER PUBLICATIONS

International Search Report for PCT/JP2018/015040 dated Jun. 26, 2018.
Written Opinion of the International Searching Authority for PCT/JP2018/015040 dated Jun. 26, 2018.

\* cited by examiner

*Primary Examiner* — Tae H Yoon
(74) *Attorney, Agent, or Firm* — Birch, Stewart, Kolasch & Birch, LLP

(57) ABSTRACT

A poly(meth)acrylate represented by formula (1) can impart a hardcoat layer having exceptional scratch resistance, strong impact resistance, and excellent weather resistance, especially weather crack resistance.

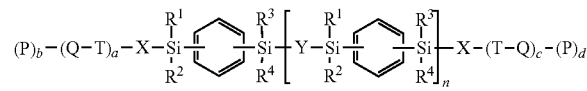

(1)

($R^1$-$R^4$ represent hydrogen atoms, etc.; Y represents a divalent hydrocarbon group having a polycyclic structure; X represents a divalent or trivalent saturated hydrocarbon group in which at least one selected from oxygen atoms, etc., may be interposed; T represents a urethane group (bonds with X by an oxygen atom); Q represents a divalent or trivalent saturated hydrocarbon group in which at least one selected from oxygen atoms, etc., may be interposed; P represents a (meth)acryloyloxy group; a and c represent the number of Q-T bonded to X, a and c being 1 when X is divalent and 2 when X is trivalent; b and d represent the number of (meth)acryloyloxy groups bonded to Q, b and d being 1 or 2 when a or c is 1, and being 2, 3, or 4 when a is 2; and n represents an integer of 0-6.)

15 Claims, 3 Drawing Sheets

POLY(METH)ACRYLATE, AND COATING COMPOSITION AND COATED ARTICLE CONTAINING SAME

CROSS-REFERENCE TO RELATED APPLICATIONS

This application is the National Phase of PCT International Application No. PCT/JP2018/015040, filed on Apr. 10, 2018, which claims priority under 35 U.S.C. § 119(a) to Patent Application No. 2017-127284, filed in Japan on Jun. 29, 2017, all of which are hereby expressly incorporated by reference into the present application.

TECHNICAL FIELD

This invention relates to a poly(meth)acrylate, a coating composition comprising the same, and a coated article.

BACKGROUND ART

Generally, thermoplastic substrates such as polycarbonate and poly(methyl methacrylate) have many advantageous properties such as clarity, high ductility, high heat deflection temperature and high dimensional stability. Most of these materials are transparent and are conventionally employed as glass replacements in many commercial applications.

However, the thermoplastic materials are not only susceptible to scratch and abrasion damages, with the risk of transparency lowering, but also susceptible to degradation by ultraviolet (UV) light, giving rise to problems like yellowing and whitening of the surface.

One solution to these problems of thermoplastic materials is by applying a mar resistant coating or so-called hardcoat film onto the surface of resin substrates.

As the hardcoat, photo-curable (meth)acrylic coating compositions using polyfunctional (meth)acrylates are generally known. The photo-curable (meth)acrylic coating composition comprising at least one polyfunctional (meth)acrylate and a photopolymerization initiator forms a film as a result of crosslinking taking place via photopolymerization of (meth)acrylic groups on the polyfunctional (meth)acrylate. The film becomes a hardcoat which develops excellent scratch resistance, wear resistance, hardness, and chemical resistance.

A hardcoat of polyfunctional (meth)acrylate cured by actinic radiation is resistant to scratches and wear. Upon receipt of impact, however, cracks or damages can often occur over the entire thermoplastic items.

Also, when exposed to an outdoor environment for a long period of time, the coating may undergo cracking due to a decline of toughness or chalking due to degradation.

To overcome these problems, Patent Documents 1 to 3 propose the methods for imparting flexibility to the hardcoat by combining oligomers or monomers of (meth)acrylate having mono functionality or a high double bond equivalent.

Although the above-described methods are successful in improving the impact resistance of hardcoat, there arises the problem that hardness is significantly reduced to detract from scratch resistance and wear resistance because of the tradeoff relationship between flexibility and hardness of the hardcoat.

As discussed above, it is quite difficult to meet all the factors that the hardcoat has to clear, including hardness, sufficient flexibility to withstand impact, and (weather crack) resistance against weather cracks which can be incurred by a loss of toughness during long-term outdoor exposure.

Actinic radiation-curable coating compositions are proposed as the means for satisfying scratch resistance, wear resistance, and impact resistance at the same time, for example, a combination of a urethane acrylate obtained from a polyalkylene glycol derivative and silica fine particles (Patent Document 4), a combination of a urethane (meth)acrylate having a tricyclodecane dimethanol skeleton and silica fine particles (Patent Document 5), and a composition comprising a urethane (meth)acrylate having an alicyclic structure (Patent Document 6).

Although the coatings formed from the compositions of Patent Documents 4 to 6 develop scratch resistance, wear resistance, and impact resistance to some extent, there is left the problem that the coatings crack or chalk during long-term outdoor exposure.

As the means for imparting toughness while maintaining hardness, Patent Documents 7 to 9 disclose to incorporate a silphenylene skeleton into the backbone. These methods impart toughness despite high hardness by incorporating a silphenylene skeleton to restrain movement of the backbone and make the backbone rigid. These methods are based on the curing mode via silanol condensation reaction or addition reaction.

Patent Documents 10 and 11 describe compounds containing a (meth)acrylic group and having a silphenylene skeleton incorporated in their backbone, and photo-curable compositions comprising the compounds. Although the films formed from these compositions have excellent mechanical properties inherent to the silphenylene skeleton, no reference is made to weather resistance. Since aromatic rings are generally less weather resistant and susceptible to yellowing, few examples are used in the photo-curable coating application.

PRIOR ART DOCUMENTS

Patent Documents

Patent Document 1: JP-A 2005-255979
Patent Document 2: JP-A 2002-212500
Patent Document 3: JP-A H06-263809
Patent Document 4: JP-A 2007-016215
Patent Document 5: WO 2013/114750
Patent Document 6: JP-A 2010-215843
Patent Document 7: JP-A 2001-064393
Patent Document 8: JP-A 2005-133073
Patent Document 9: JP-A 2017-039885
Patent Document 10: JP-A 2003-306492
Patent Document 11: JP-A 2003-327626

SUMMARY OF INVENTION

Technical Problem

An object of the invention, which has been made under the above-mentioned circumstances, is to provide a poly (meth)acrylate capable of forming a hardcoat layer having excellent scratch resistance, high impact resistance, and good weather resistance, especially weather crack resistance, a coating composition comprising the same, and a coated article.

Solution to Problem

Making extensive investigations to attain the above object, the inventor has found that a novel poly(meth) acrylate having the following general formula (1) is readily prepared through some steps and that a composition comprising the poly(meth)acrylate in combination with various binder precursors such as photo-curable polyfunctional (meth)acrylates forms a coating film having excellent mar resistance, crack resistance, and weather resistance. The invention is predicated on this finding.

The invention is as defined below.
1. A poly(meth)acrylate having the general formula (1):

[Chem. 1]

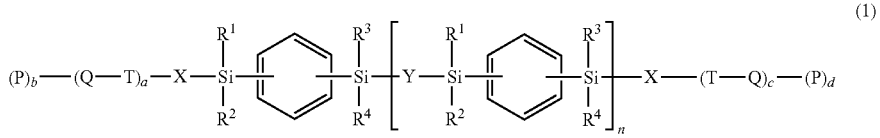

wherein $R^1$ to $R^4$ are each independently hydrogen or a monovalent hydrocarbon group which may be separated by at least one atom selected from oxygen, nitrogen, sulfur, and phosphorus, Y is a divalent hydrocarbon group having a polycyclic structure, X is each independently a di- or trivalent saturated hydrocarbon group which may be separated by at least one atom selected from oxygen, nitrogen, sulfur, and phosphorus, T is a urethane group: —O—(C=O)—NH— wherein the oxygen bonds to X, Q is each independently a di- or trivalent saturated hydrocarbon group which may be separated by at least one atom selected from oxygen, nitrogen, sulfur, and phosphorus, P is a (meth)acryloyloxy group, a representative of the number of Q-T bonded to X is 1 when X is divalent, and 2 when X is trivalent, b representative of the number of (meth)acryloyloxy groups bonded to Q is 1 or 2 in case of a=1, and 2, 3 or 4 in case of a=2, c representative of the number of Q-T bonded to X is 1 when X is divalent, and 2 when X is trivalent, d representative of the number of (meth)acryloyloxy groups bonded to Q is 1 or 2 in case of c=1, and 2, 3 or 4 in case of c=2, and n is an integer of 0 to 6.

2. The poly(meth)acrylate of 1 wherein Y is a divalent saturated hydrocarbon group having a polycyclic structure.

3. The poly(meth)acrylate of 1 or 2 wherein Y is one or more groups selected from divalent saturated hydrocarbon groups having the following formulae (2a) to (2d):

[Chem. 2]

(2a)

(2b)

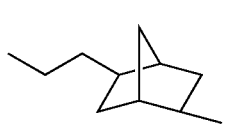

(2c)

-continued

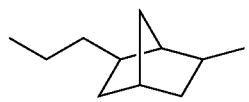

(2d)

4. The poly(meth)acrylate of any one of 1 to 3 wherein X is each independently a group having the following formula (3) or (4):

[Chem. 3]

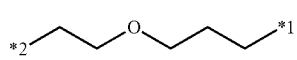

(3)

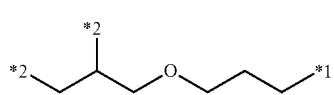

(4)

wherein 1* bonds to the silicon in formula (1) and 2* bonds to the oxygen on the urethane group in formula (1).

5. The poly(meth)acrylate of any one of 1 to 4 wherein Q is each independently a group having the following formula (5) or (6):

[Chem. 4]

(5)

(6)

wherein 3* bonds to P in formula (1) and 4* bonds to the nitrogen on the urethane group in formula (1).

6. The poly(meth)acrylate of 5 wherein R' to $R^4$ are methyl, X is a group having formula (3), and a and c each are 1.

7. The poly(meth)acrylate of any one of 1 to 6 wherein n is an integer of 1 to 3.

8. A method of preparing the poly(meth)acrylate of 1, comprising the steps of effecting addition reaction of a compound having two silicon-bonded hydrogen atoms per molecule, represented by the following formula (7):

[Chem. 5]

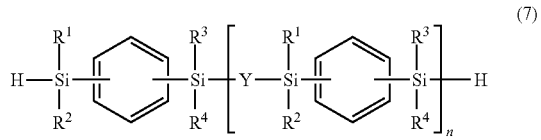

(7)

wherein R¹ to R⁴, Y and n are as defined above, with a compound having one addition reactive carbon-carbon double bond per molecule and a hydroxyl group to form an addition reaction product having the following formula (8):

[Chem. 6]

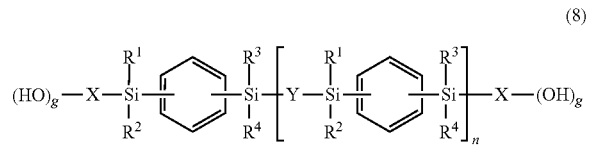

(8)

wherein R¹ to R⁴, X, Y and n are as defined above and g is an integer of 1 or 2, and reacting the hydroxyl group on the addition reaction product with an isocyanate group on a compound having the following formula (9):

[Chem. 7]

OCN-Q-(-P)$_h$        (9)

wherein Q and P are as defined above and h is an integer of 1 or 2.

[Chem. 8]

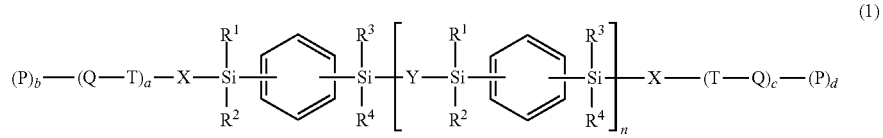

(1)

9. A coating composition comprising the poly(meth)acrylate of any one of 1 to 7 and a binder precursor other than the poly(meth)acrylate.
10. The coating composition of 9 wherein the binder precursor comprises at least one monofunctional or polyfunctional (meth)acrylate and at least one photopolymerization initiator.
11. The coating composition of 9 or 10 wherein the binder precursor contains at least one compound selected from the group consisting of urethane poly(meth)acrylates and hydrolyzates or hydrolytic condensates of (meth)acryloyl-containing alkoxysilanes.
12. The coating composition of any one of 9 to 11, further comprising colloidal silica which is surface treated with a (meth)acrylic functional alkoxysilane.
13. The coating composition of any one of 9 to 12, further comprising one or more additives selected from UV absorbers, antifouling agents, water repellents, hydrophilizing agents, leveling agents, colorants, pigments, adhesion promoters, IR absorbers, photostabilizers, curing catalysts (exclusive of the photopolymerization initiator in 10), and metal oxide fine particles (exclusive of the colloidal silica in 12).
14. A coated article comprising a substrate and a cured film of the coating composition of any one of 9 to 13 formed on the substrate directly or via at least one other layer.
15. The coated article of 14 wherein the substrate is an organic resin or wood.

Advantageous Effects of Invention

According to the invention, there is provided a poly(meth)acrylate-containing coating composition capable of forming a film having excellent crack resistance and toughness while maintaining mar resistance.

The film formed from the poly(meth)acrylate-containing coating composition exhibits a high level of weather crack resistance.

DESCRIPTION OF EMBODIMENTS

Figure 1:
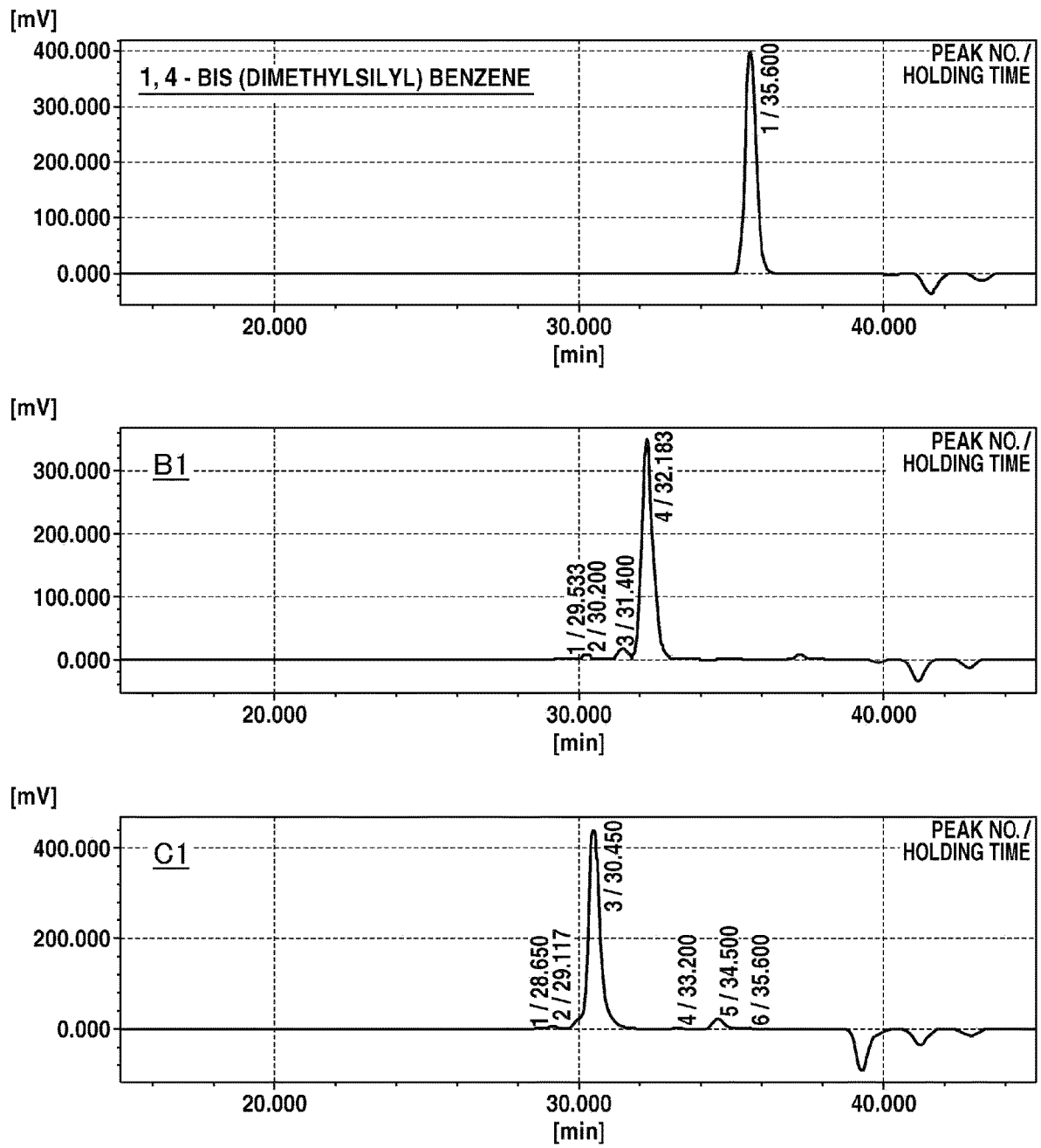
FIG. 1 is a diagram showing the GPC charts of 1,4-bis(dimethylsilyl)benzene used in Example 1 and compounds (B1) and (C1) obtained in Example 1.
Figure 2:
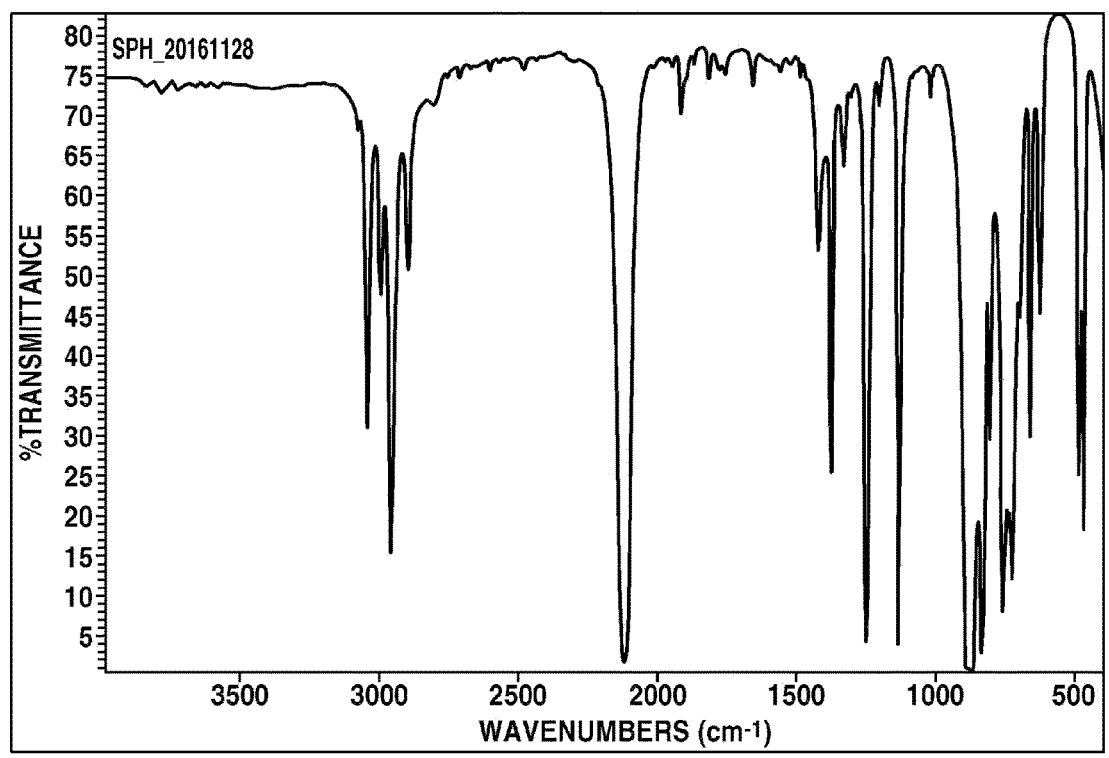
FIG. 2 is a diagram showing the IR chart of 1,4-bis(dimethylsilyl)benzene used in Example 1.
Figure 3:
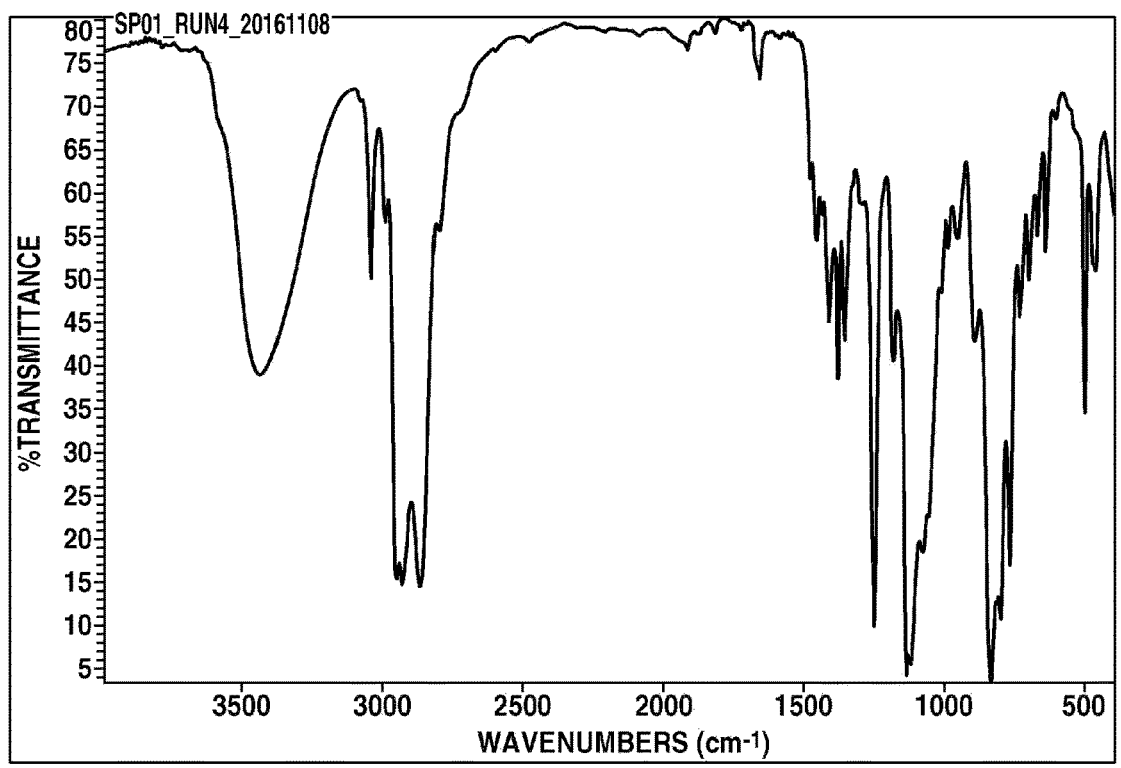
FIG. 3 is a diagram showing the IR chart of compound (B1) obtained in Example 1.
Figure 4:
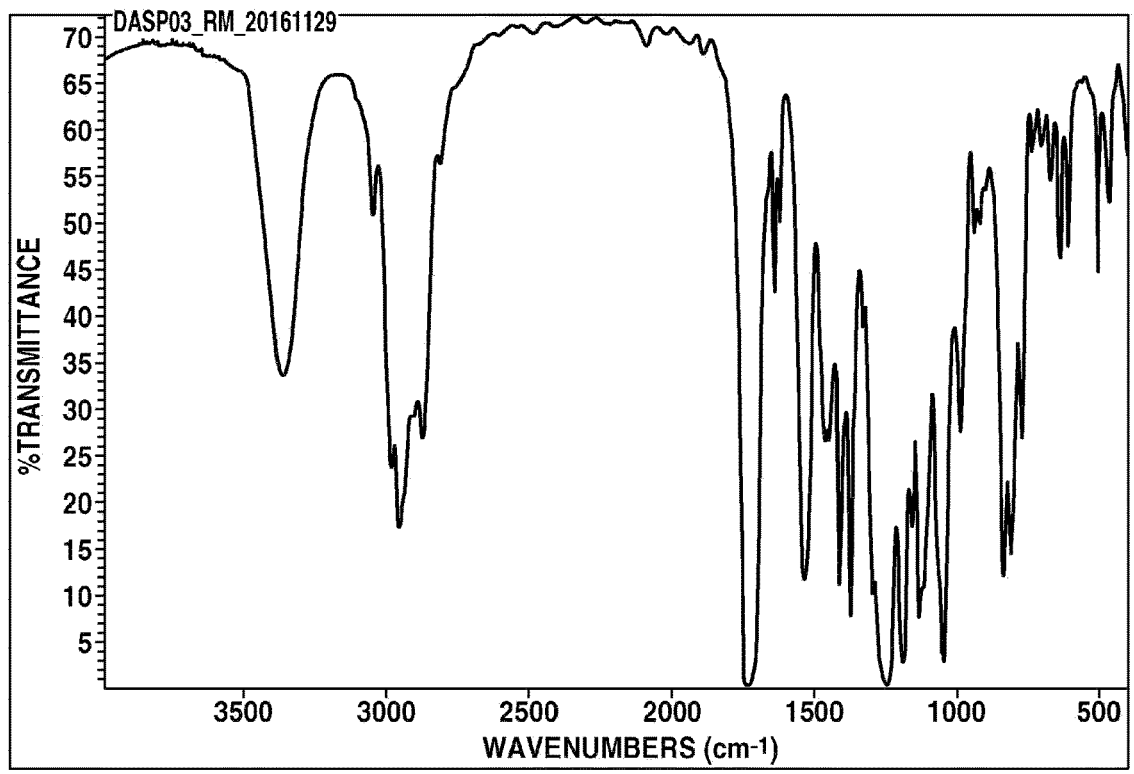
FIG. 4 is a diagram showing the IR chart of compound (C1) obtained in Example 1.
Figure 5:
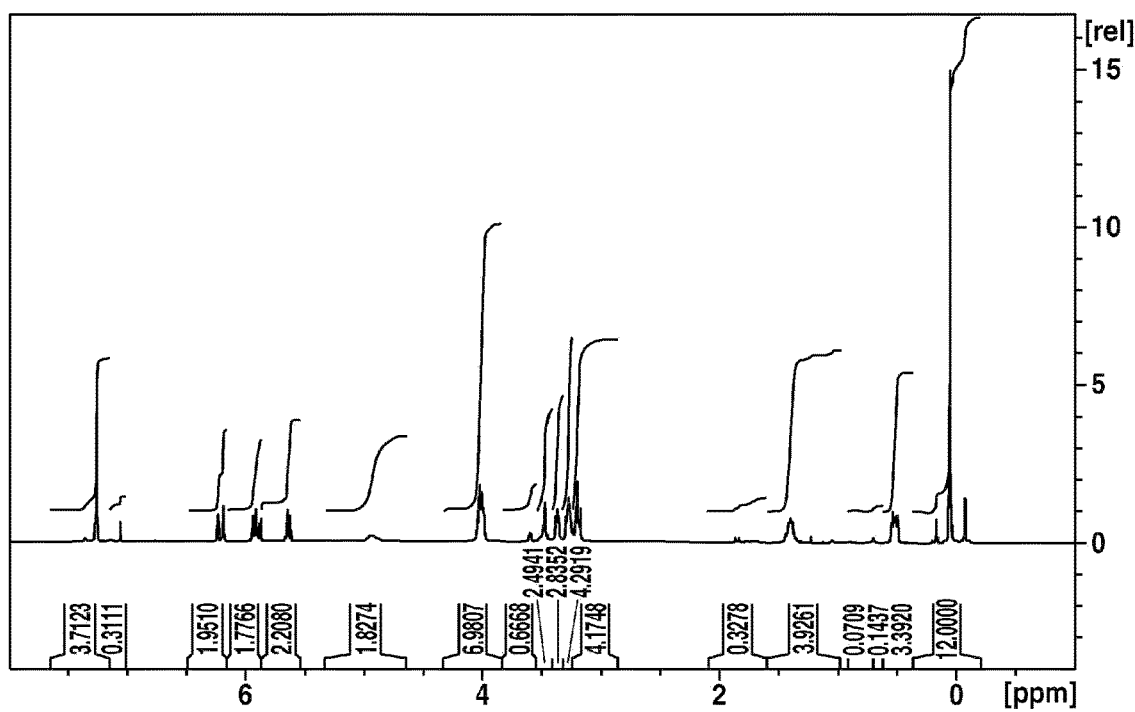
FIG. 5 is a diagram showing the ¹H-NMR chart of compound (C1) obtained in Example 1.

Now the invention is described in detail.
The invention provides a poly(meth)acrylate having the following general formula (1).

In formula (1), R¹ to R⁴ are each independently hydrogen or a monovalent hydrocarbon group which may be separated by at least one atom selected from oxygen, nitrogen, sulfur, and phosphorus, Y is a divalent hydrocarbon group having a polycyclic structure, X is each independently a di- or trivalent saturated hydrocarbon group which may be separated by at least one atom selected from oxygen, nitrogen, sulfur, and phosphorus, T is a urethane group: —O—(C=O)—NH— wherein the oxygen bonds to X, Q is each independently a di- or trivalent saturated hydrocarbon group which may be separated by at least one atom selected from oxygen, nitrogen, sulfur, and phosphorus, and P is a (meth)acryloyloxy group.

In formula (1), the monovalent hydrocarbon groups represented by R¹ to R⁴ may be straight, branched or cyclic and are preferably of 1 to 20 carbon atoms. Examples include alkyl groups such as methyl, ethyl, n-propyl, isopropyl, n-butyl, isobutyl, tert-butyl, n-hexyl, cyclohexyl, n-octyl, 2-ethylhexyl, and n-decyl; alkenyl groups such as vinyl, allyl (or 2-propenyl), 1-propenyl, isopropenyl, and butenyl; aryl groups such as phenyl, tolyl, xylyl, and naphthyl; and aralkyl groups such as benzyl, phenylethyl, and phenylpropyl.

Of these, $R^1$ to $R^4$ are preferably selected from hydrogen, $C_1$-$C_{20}$ alkyl and $C_6$-$C_{12}$ aryl groups, more preferably $C_1$-$C_{10}$ alkyl groups, even more preferably $C_1$-$C_5$ alkyl groups, with methyl being most preferred.

Notably, the monovalent hydrocarbon group may be a group having at least one atom selected from oxygen, nitrogen, sulfur, and phosphorus intervening in its molecular chain or at the end on the silicon side, for example, a $C_1$-$C_{20}$ alkoxy group.

Examples of the divalent hydrocarbon group having a polycyclic structure, represented by Y, include groups having the following formulae (2a) to (2d) and (10a) to (10f), but are not limited thereto.

Of these, groups having formulae (2a) to (2d) are preferred.

Notably, the asymmetric divalent hydrocarbon group having the following formula is not limited to the left-right direction shown below and may have a structure arrived at by rotating each formula 180° on the plane of paper. The hydrocarbon group of the formula may also be a combination of such structures.

[Chem. 9]

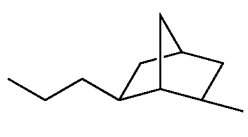
(2a)

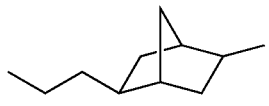
(2b)

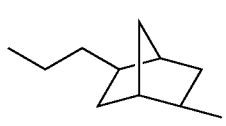
(2c)

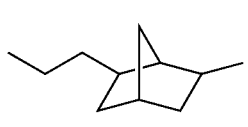
(2d)

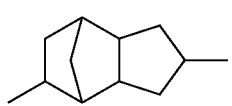
(10a)

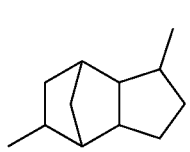
(10b)

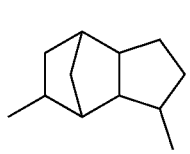
(10c)

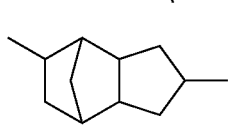
(10d)

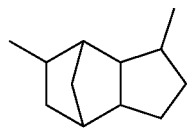
(10e)

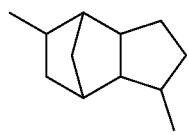
(10f)

The di- or trivalent saturated hydrocarbon group which may be separated by at least one atom selected from oxygen, nitrogen, sulfur, and phosphorus, represented by X, may be straight, branched or cyclic. In view of ease of synthesis and availability of reactants, groups having the following formulae (3) and (4) are preferred, with the group of formula (3) being more preferred.

[Chem. 10]

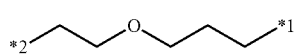
(3)

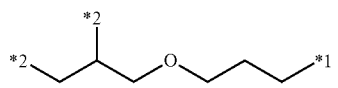
(4)

Herein 1* and 2* are as defined above.

The di- or trivalent saturated hydrocarbon group which may be separated by at least one atom selected from oxygen, nitrogen, sulfur, and phosphorus, represented by Q, may be straight, branched or cyclic. Examples include straight or branched $C_1$-$C_5$ di- or trivalent saturated hydrocarbon groups such as —$CH_2$—, —$CH_2CH_2$— (formula (5)), —$CH(CH_3)CH_2$—, —$(CH_2)_4$—, —$CH(CH_3)CH_2CH_2$—, —$C(CH_3)_2CH_2$—, =CH—, =$CHCH_2$—, =$C(CH_3)CH_2$—, and —$C(CH_3)(CH_2$-$)_2$ (formula (6)). Notably, the symbol "=" used herein designates two valence bonds, but not a double bond.

Of these, groups having the following formulae (5) and (6) are preferred for ease of synthesis and availability of reactants, with the group of formula (6) being more preferred.

[Chem. 11]

(5)

(6)

Herein 3* and 4* are as defined above.

T is a urethane group: —O—(C=O)—NH—, which bonds to X via the oxygen in it.

P is a (meth)acryloxy group, specifically having the general formula (11).

[Chem. 12]

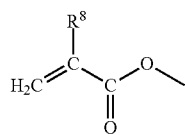
(11)

Herein $R^8$ is hydrogen or methyl.

In formula (1), "a" representative of the number of Q-T bonded to X is 1 when X is divalent, and 2 when X is trivalent, b representative of the number of (meth)acryloyloxy groups bonded to Q is 1 or 2 in case of a=1, and 2, 3 or 4 in case of a=2, c representative of the number of Q-T bonded to X is 1 when X is divalent, and 2 when X is trivalent, d representative of the number of (meth)acryloyloxy groups bonded to Q is 1 or 2 in case of c=1, and 2, 3 or 4 in case of c=2, and n is an integer of 0 to 6. Preferably, a and c each are 1 (in this case, b and d each are 1 or 2, preferably 2), and n is an integer of 0 to 3, more preferably 1 to 3.

Preferred examples of the poly(meth)acrylate having formula (1) include compounds having the following formulae (3-1) to (3-5) for availability of reactants, compatibility with a relatively high polarity binder precursor such as polyfunctional (meth)acrylate, and photo-curability, but are not limited thereto.

[Chem.13]

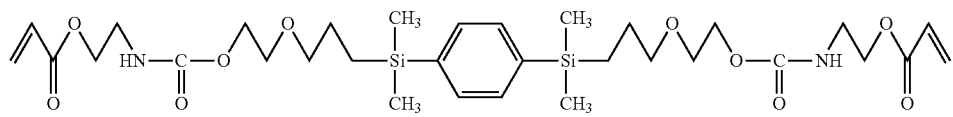
(3-1)

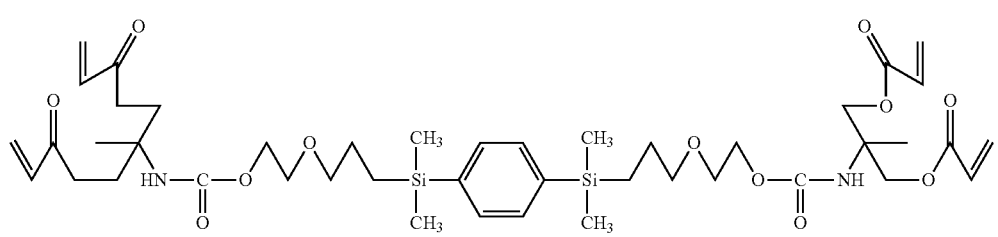
(3-2)

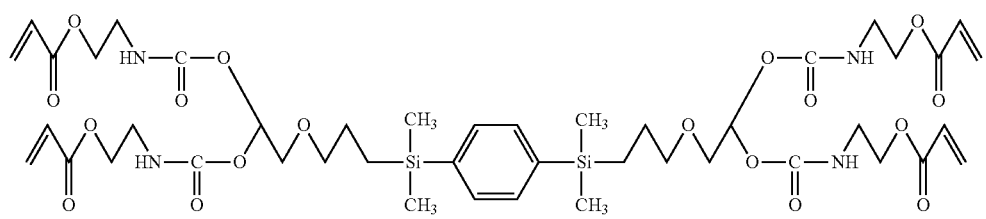
(3-3)

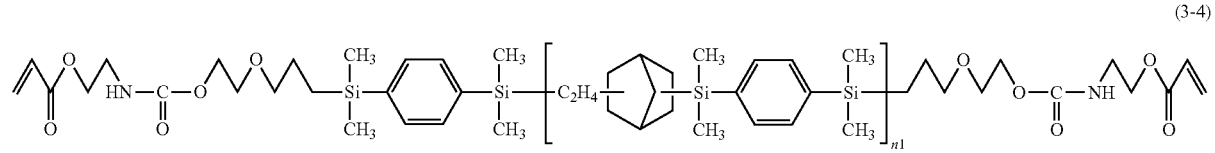
(3-4)

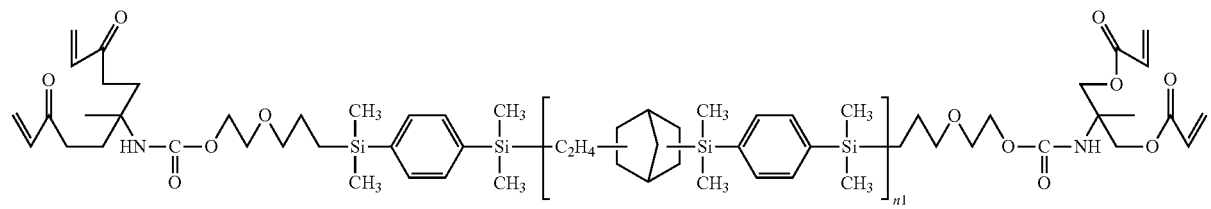
(3-5)

Herein n1 is an integer of 1 to 6.

The poly(meth)acrylate may be prepared, for example, by a combination of standard transesterification reaction with urethanating reaction. Especially preferred is a method comprising the step 1 of effecting addition reaction of a compound having two silicon-bonded hydrogen atoms per molecule, represented by the following formula (7), with a compound having one addition reactive carbon-carbon double bond per molecule and a hydroxyl group to form an addition reaction product having the following formula (8) and the step 2 of reacting the hydroxyl group on the addition reaction product with an isocyanate group on a compound having the following formula (9).

[Chem. 15]

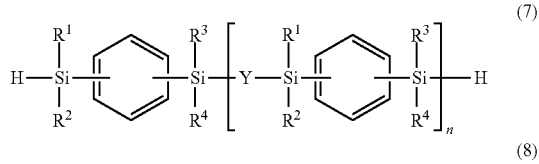

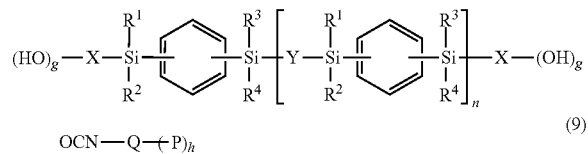

Herein $R^1$ to $R^4$, Y, n, Q and P are as defined above, g is an integer of 1 or 2, and h is an integer of 1 or 2.

(1) Step 1

The compound of formula (7) used in step 1 is not particularly limited as long as it is a compound having a silphenylene skeleton and optionally a divalent hydrocarbon group Y of polycyclic structure, and containing two silicon-bonded hydrogen atoms per molecule. Examples include 1,4-bis(dimethylsilyl)benzene, 1,3-bis(dimethylsilyl)benzene, and compounds having the following formula (1-1).

In step 1, the compound of formula (7) may be used alone or in combination of two or more.

[Chem. 16]

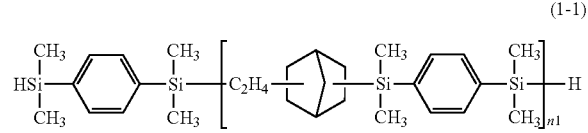

Herein n1 is as defined above.

On the other hand, the compound having one addition reactive carbon-carbon double bond per molecule and a hydroxyl group is preferably allyl alcohol, allyl glycol (or ethylene glycol monoallyl ether) or 3-allyloxy-1,2-propanediol, although it is not particularly limited.

The compound having one addition reactive carbon-carbon double bond per molecule and a hydroxyl group is preferably used in an amount of more than 2 moles to 10 moles, more preferably more than 2 moles to 5 moles per mole of the compound of formula (7).

A catalyst may be used in the reaction of step 1.

The catalyst may be any of well-known catalysts commonly used in hydrosilylation addition reaction. Examples include platinum group metal based catalysts such as platinum metal-on-carbon powder, platinic chloride, chloroplatinic acid, the reaction products of chloroplatinic acid with monohydric alcohols, complexes of chloroplatinic acid with olefins, and palladium and rhodium based catalysts.

For preventing side reactions to avoid coloration of the product, the catalyst is preferably used in an amount of 0 to 2% by weight, more preferably 5 to 5,000 ppm based on the total weight of the compound of formula (7).

Also a solvent may be used in the reaction of step 1.

The solvent is preferably one in which the compound of formula (7) and the compound having one addition reactive carbon-carbon double bond per molecule and a hydroxyl group are dissolvable.

Examples of the solvent used herein include hydrocarbon solvents such as pentane, hexane, cyclohexane, heptane, isooctane, toluene, xylene, and mesitylene, alcohol solvents such as methanol, ethanol, and isopropanol, aprotic polar solvents such as acetonitrile, propionitrile, N,N-dimethylformamide, and N-methylpyrrolidone, halogenated hydrocarbon solvents such as dichloromethane, dichloroethane, and chlorobenzene, and ether solvents such as diethyl ether, tetrahydrofuran, dioxane, and dimethoxyethane. These solvents may be used alone or in admixture.

The reaction temperature of step 1 is preferably 10 to 200° C., more preferably 20 to 150° C. from the standpoints of reducing the reaction time to improve productivity and preventing side reactions to avoid coloration of the product.

(2) Step 2

In formula (9) representing the compound to be reacted with the compound of formula (8) resulting from step 1, h is preferably 2. Notably, it is difficult to synthesize or purchase compounds of formula (9) wherein h is more than 2.

The compound of formula (9) is commercially available. Examples of the commercial product include 2-acryloyloxyethyl isocyanate (trade name Karenz AOI by Showa Denko K.K.), 1,1-bis(acryloyloxymethyl)ethyl isocyanate (trade name Karenz BEI by Showa Denko K.K.), and 2-methacryloyloxyethyl isocyanate (trade name Karenz MOI by Showa Denko K.K.).

In the reaction of step 2, the amount of the compound of formula (9) used is not particularly limited and may be adjusted depending on the number of hydroxyl groups in the compound of formula (8). The amount of the compound of formula (9) is preferably such that isocyanate groups are available in an equimolar amount to the hydroxyl groups in the compound of formula (8). In particular, because of the tendency that the coating composition becomes less storage stable when some isocyanate groups are left unreacted, the amounts of the compound of formula (8) and the compound of formula (9) used are preferably adjusted in such a ratio that no isocyanate groups are left in the reaction product.

In the urethanating reaction, a polymerization inhibitor such as p-methoxyphenol may be used to suppress polymerization of (meth)acryloxy groups.

The polymerization may also be suppressed by performing the reaction in air atmosphere or a 4% oxygen-containing nitrogen atmosphere. The combination of polymerization inhibitor with atmosphere is also acceptable.

A catalyst may be used in the reaction of step 2.

The catalyst may be any of well-known catalysts commonly used in urethanating reaction. For example, tin and amine-based catalysts may be used.

For preventing side reactions to avoid coloration of the product, the catalyst is preferably used in an amount of 0 to 1% by weight, more preferably 10 to 5,000 ppm based on the total weight of the compounds having formulae (8) and (9).

A solvent may be used in the reaction of step 2.

Examples of the solvent used herein include hydrocarbon solvents such as pentane, hexane, cyclohexane, heptane, isooctane, toluene, xylene, and mesitylene, aprotic polar solvents such as acetonitrile, propionitrile, N,N-dimethylformamide, and N-methylpyrrolidone, halogenated hydrocarbon solvents such as dichloromethane, dichloroethane, and chlorobenzene, and ether solvents such as diethyl ether, tetrahydrofuran, dioxane, and dimethoxyethane. These solvents may be used alone or in admixture.

The solvent is preferably one that can dissolve the compound of formula (8) and is free of active hydrogen for preventing formation of by-products. A solvent used for preparation of the coating composition is preferably selected in step 2 because the coating composition may be prepared without removing the solvent from the reaction mixture of step 2.

For the purpose of water removal from the reaction system, azeotropic water removal and dewatering treatment by molecular sieves may be carried out.

The reaction temperature of step 2 is preferably 10 to 200° C., more preferably 20 to 150° C. from the standpoints of reducing the reaction time to improve productivity and preventing side reactions to avoid coloration of the product.

The coating composition comprises the poly(meth)acrylate described above and a binder precursor other than the poly(meth)acrylate.

The binder precursor is not particularly limited as long as it is a substance other than the poly(meth)acrylate of the invention and serves as a coating binder. Exemplary binder precursors include those of thermoplastic resin type such as (meth)acrylic resins and polyurethane resins, photo-curable (meth)acrylic type comprising mono or polyfunctional (meth)acrylates, photo or heat-curable epoxy type comprising mono or polyfunctional epoxy compounds, and heat-curable silicone type comprising silanol.

Of these, photo-curable (meth)acrylic type binder precursors comprising mono or polyfunctional (meth)acrylates are preferred from the aspects of productivity and durability.

The mono or polyfunctional (meth)acrylates as the photo-curable (meth)acrylic type binder precursor are not particularly limited as long as they are photo-curable. Examples include mono and polyfunctional (meth)acrylates having a polymerizable unsaturated bond, such as urethane (meth)acrylates, epoxy (meth)acrylates, polyester (meth)acrylates, hydrolyzates/condensates of (meth)acryloyloxyalkoxysilanes, and organic-inorganic hybrid (meth)acrylates obtained from hydrolytic condensation between colloidal silica and (meth)acryloyloxyalkoxysilanes. A suitable binder precursor may be selected depending on the desired coating properties.

Examples of the monofunctional (meth)acrylate include methyl (meth)acrylate, ethyl (meth)acrylate, butyl (meth)acrylate, propyl (meth)acrylate, n-butyl (meth)acrylate, i-butyl (meth)acrylate, t-butyl (meth)acrylate, hexyl (meth)acrylate, 2-ethylhexyl (meth)acrylate, lauryl (meth)acrylate, stearyl (meth)acrylate, morpholyl (meth)acrylate, 2-hydroxyethyl (meth)acrylate, 2-hydroxypropyl (meth)acrylate, 4-hydroxybutyl (meth)acrylate, glycidyl (meth)acrylate, dimethylaminoethyl (meth)acrylate, diethylaminoethyl (meth)acrylate, tricyclodecane (meth)acrylate, polyethylene glycol mono(meth)acrylate, cyclohexyl (meth)acrylate, tetrahydrofurfuryl (meth)acrylate, dicyclopentanyl (meth)acrylate, dicyclopentenyl (meth)acrylate, isobornyl (meth)acrylate, allyl (meth)acrylate, 2-ethoxyethyl (meth)acrylate, benzyl (meth)acrylate, phenoxyethyl (meth)acrylate, phenyl (meth)acrylate, and adducts of phthalic anhydride and 2-hydroxyethyl (meth)acrylate.

Examples of the polyfunctional (meth)acrylate include neopentyl glycol di(meth)acrylate, ethylene glycol di(meth)acrylate, polyethylene glycol (repeating unit number, referred to as "n" hereinafter, =2-15) di(meth)acrylate, polypropylene glycol (n=2-15) di(meth)acrylate, polybutylene glycol (n=2-15) di(meth)acrylate, 2,2-bis(4-(meth)acryloxyethoxyphenyl)propane, 2,2-bis(4-(meth)acryloxydiethoxyphenyl)propane, trimethylolpropane diacrylate, bis(2-(meth)acryloxyethyl)hydroxyethyl isocyanurate, trimethylolpropane tri(meth)acrylate, tris(2-(meth)acryloxyethyl)isocyanurate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, epoxy poly(meth)acrylates such as epoxy di(meth)acrylate which is obtained by reaction of bisphenol A diepoxy with (meth)acrylic acid, urethane poly(meth)acrylates such as urethane tri(meth)acrylate which is obtained by reaction of a trimer of 1,6-hexamethylene diisocyanate with 2-hydroxyethyl (meth)acrylate, urethane di(meth)acrylate which is obtained by reaction of isophorone diisocyanate with 2-hydroxypropyl (meth)acrylate, urethane hexa(meth)acrylate which is obtained by reaction of isophorone diisocyanate with pentaerythritol tri(meth)acrylate, urethane di(meth)acrylate which is obtained by reaction of dicyclohexyl diisocyanate with 2-hydroxyethyl (meth)acrylate, and urethane di(meth)acrylate which is obtained by reaction of a urethanated reaction product between dicyclohexyl diisocyanate and poly(n=6-15) tetramethylene glycol, with 2-hydroxyethyl (meth)acrylate, and polyester poly(meth)acrylates such as polyester (meth)acrylate which is obtained by reaction of trimethylolethane, succinic acid and (meth)acrylic acid, and polyester (meth)acrylate which is obtained by reaction of trimethylolpropane, succinic acid, ethylene glycol and (meth)acrylic acid.

Examples of the organic-inorganic hybrid (meth)acrylate include those which are obtained by (co)hydrolytic condensation of 3-(meth)acryloxypropylmethyldimethoxysilane, 3-(meth)acryloxypropyltrimethoxysilane, 2-(meth)acryloxyethyltrimethoxysilane, 2-(meth)acryloxyethyltriethoxysilane, (meth)acryloxymethyltrimethoxysilane, (meth)acryloxymethyltriethoxysilane, 3-(meth)acryloxypropylmethyldiethoxysilane, 3-(meth)acryloxypropyltriethoxysilane, 8-(meth)acryloxyoctyltrimethoxysilane, and 8-(meth)acryloxyoctyltriethoxysilane, or a mixture thereof with another silane, optionally in the presence of colloidal silica.

The photo-curable (meth)acrylic type binder precursors may be used alone, but preferably in combination of two or more, if necessary.

Specifically, a suitable combination consists of one or two polyfunctional (meth)acrylates and at least one compound selected from urethane poly(meth)acrylates having at least two radical polymerizable unsaturated double bonds per molecule and hydrolyzates or hydrolytic condensates of (meth)acryloyl-containing alkoxysilanes.

Among others, from the standpoint of forming a coating having improved heat resistance, chemical resistance, durability, and substrate adhesion, preference is given to combinations of hexanediol di(meth)acrylate or mono or polypentaerythritol poly(meth)acrylate with urethane poly(meth)acrylates having at least two radical polymerizable unsaturated double bonds per molecule, poly[(meth)acryloyloxyalkyl](iso)cyanurates, (co)hydrolyzates/condensates of (meth)acryloyloxypropylalkoxysilane alone or along with another silane, or organic-inorganic hybrid (meth)acrylates which are obtained from (co)hydrolytic condensation of colloidal silica and (meth)acryloyloxypropylalkoxysilane alone or along with another silane.

The content of the poly(meth)acrylate in the coating composition is preferably 1 to 100 parts by weight, more preferably 5 to 90 parts by weight per 100 parts by weight of the poly(meth)acrylate and the binder precursor combined, when it is considered that a cured film of the composition is improved in weather crack resistance as well as mar resistance and substrate adhesion.

The coating composition may further comprise a photopolymerization initiator.

A suitable photopolymerization initiator may be selected from the standpoints of compatibility in and curability of the coating composition. Examples include carbonyl compounds such as benzoin, benzoin monomethyl ether, benzoin isopropyl ether, acetoin, benzil, benzophenone, p-methoxybenzophenone, diethoxyacetophenone, benzyl dimethyl ketal, 2,2-diethoxyacetophenone, 1-hydroxycyclohexyl phenyl ketone, methyl phenylglyoxylate, 2-hydroxy-2-methyl-1-phenylpropan-1-one; sulfur compounds such as tetramethylthiuram monosulfide and tetramethylthiuram disulfide; phosphorus compounds such as 2,4,6-trimethylbenzoyl diphenylphosphine oxide, 2,4,6-trimethylbenzoyl phenyl ethoxyphosphine oxide, bis(2,4,6-trimethylbenzoyl)-phenylphosphine oxide, bis(2,6-dimethoxybenzoyl)-2,4,4-trimethylpentylphosphine oxide; 2-benzyl-2-dimethylamino-1-(4-morpholinophenyl)butanone-1, and camphorquinone. These compounds may be used alone or in admixture. In the latter case, any combination is possible depending on the desired coating properties.

When used, the content of the photopolymerization initiator in the composition is preferably 0.1 to 10 parts by weight, more preferably 1 to 8 parts by weight per 100 parts by weight of the poly(meth)acrylate and the binder precursor combined for adequately controlling the cure rate of the coating, improving mar resistance and substrate adhesion of the cured coating, and preventing coloration and decline of weather resistance of the cured coating.

The inventive coating composition may further comprise other additives as long as the benefits of the invention are not impaired.

Suitable additives include UV absorbers, antifouling agents, water repellents, leveling agents, colorants, pigments, antioxidants, yellowing inhibitors, bluing agents, defoamers, thickeners, anti-settling agents, antistatic agents, surfactants, adhesion promoters, IR absorbers, photostabilizers, curing catalysts other than the above photopolymerization initiator, and metal oxide fine particles other than the above colloidal silica surface treated with a (meth)acrylic functional alkoxysilane.

Especially, the coating composition preferably comprises at least one additive selected from among UV absorbers, antifouling agents, water repellents, leveling agents, colorants, pigments, adhesion promoters, IR absorbers, photostabilizers, curing catalysts other than the above photopolymerization initiator, and metal oxide fine particles other than the above colloidal silica surface treated with a (meth) acrylic functional alkoxysilane.

The inventive coating composition may further comprise an organic solvent.

The organic solvent is preferably selected in accordance with a particular coating method.

Suitable solvents include alcoholic solvents such as isobutanol, glycol solvents such as propylene glycol monomethyl ether, ester solvents such as n-butyl acetate, ketone solvents such as methyl isobutyl ketone, and aromatic solvents such as toluene. These solvents are used alone or in an arbitrary combination, preferably such that the coating composition may have a viscosity of up to 20 mPa·s when it is applied by spray coating, and the coating composition may have a viscosity of up to 100 mPa·s when it is applied by shower flow coating or dip coating.

In the case of a high solid type coating composition containing more than 80% by weight of solids, it is important that the solvent be selected in consideration of the solubilities of additives.

The coating composition is applied to various substrates and cured to form a cured film thereon.

Suitable curing methods include heat curing and/or photo-curing, with the photo-curing being preferred in view of productivity.

In the photo-curing method, the coating composition is applied to a substrate so as to give a predetermined film thickness, optionally treated to volatilize off the solvent, and exposed to ultraviolet rays or electron beams from high-pressure mercury lamps, metal halide lamps, LED lamps, or the like. The exposure atmosphere may be either air or an inert gas such as nitrogen or argon.

The substrate used herein is not particularly limited and includes organic resins such as molded plastics, wood items, fibers, ceramics, glass, metals, and composites thereof. Preferably the coating composition is used with plastic materials.

Especially, the coating composition is used with polycarbonate resins, polystyrene resins, acrylic resins, modified acrylic resins, urethane resins, thiourethane resins, polycondensates of halogenated bisphenol A and ethylene glycol, acrylic urethane resins, halogenated aryl-containing acrylic resins, sulfur-containing resins, polyalkylene terephthalate resins, cellulose resins, amorphous polyolefin resins, and composite resins thereof.

The resin substrates which have been surface treated, specifically by chemical conversion treatment, corona discharge treatment, flame treatment, plasma treatment, acid or alkaline treatment are also useful. Also included are laminated substrates comprising a resin substrate covered with a surface layer of a different resin from the substrate.

Exemplary laminated substrates include those consisting of a polycarbonate resin substrate and a surface layer of acrylic resin or urethane resin and those consisting of a polyester resin substrate and a surface layer of acrylic resin, which are prepared by co-extrusion or lamination technique.

The coating composition may be applied to the surface of a substrate directly or via another layer or layers such as a primer layer, UV-absorbing layer, printing layer, recording layer, heat-ray shielding layer, tacky layer, inorganic vapor-deposited layer and the like.

The coating means or method may be selected as appropriate from well-known coating means or methods such as a spin coater, comma coater, lip coater, roll coater, die coater, knife coater, blade coater, rod coater, kiss coater, gravure coater, screen printing, dipping and casting methods.

The thickness of a coating or film of the coating composition is not particularly limited although it is preferably 0.1 to 50 μm for preventing cissing on the coating, achieving sufficient mar resistance, and suppressing crack formation. A thickness of 1 to 30 μm is more preferred for the coating to fully exert desired properties including hardness, mar resistance, long-term stable adhesion, and crack resistance.

On the surface of a cured film of the coating composition, another coating layer may optionally be formed, such as an adhesive layer, UV-absorbing layer, printing layer, recording layer, heat-ray shielding layer, tacky layer, inorganic evaporated layer, water/oil repellent layer, and hydrophilic antifouling layer.

Although the cured film of the coating composition has improved mar resistance as described above, an inorganic evaporated layer may be laid on the cured film in order to impart additional mar resistance.

The inorganic evaporated layer is not particularly limited as long as it is formed by a dry film deposition method. Included are layers based on at least one metal or oxide, nitride or sulfide thereof, the metal being selected from among Si, Ti, Zn, Al, Ga, In, Ce, Bi, Sb, B, Zr, Sn, and Ta. Also included are diamond-like carbon film layers having high hardness and insulating properties.

The method for depositing an inorganic evaporated layer is not particularly limited as long as it is a dry film deposition method. Suitable dry film deposition methods include physical gas phase growth methods such as resistance heating evaporation, EB evaporation, molecular beam epitaxy, ion beam deposition, ion plating, and sputtering, and chemical vapor deposition (CVD) methods such as thermal CVD, plasma CVD, photo CVD, epitaxial CVD, atomic layer CVD, and cat-CVD.

A coated article having a cured film of the coating composition exhibits excellent mar resistance and weather resistance, especially weather crack resistance.

The coating composition is preferably used as a photocurable coating composition for articles which are intended for outdoor use.

Especially, the composition is preferably used for surface coatings of headlamp lenses of automobiles, sensors of vehicles and resin glass. These substrates are formed of polycarbonates, which are often used because of their impact resistance, heat resistance, clarity, and lightness. Polycarbonates, however, are short in properties such as chemical resistance, weather resistance, and mar resistance. The coating composition is suited to coat the surface of polycarbonates for the purpose of improving these properties.

Polycarbonates coated with the coating composition have advantages including prevention of yellowing and weather cracking of the polycarbonate, a surface hardness comparable to glass, lightweight, and easy molding. Thus the coated polycarbonates can be used in various applications such as headlamp lenses of automobiles, sensors and windows of vehicles, outdoor signboards, windows of greenhouses or outdoor buildings, roofs of terraces or garages, balconies, and covers of meters and gauges.

EXAMPLES

Examples and Comparative Examples are given below for further illustrating the invention although the invention is not limited thereto.

It is noted that all parts and % are by weight unless otherwise stated. The analyzers utilized in Examples are shown below.

(1) GPC analysis conditions
  Analyzer: HLC-8320GPC (Tosoh Co., Ltd.)
  Column: TSKgel G4000HXL+G3000HXL+G2000HXL+ G2000HXL (Tosoh Co., Ltd.), all 6 mm ID×150 mm L
  Developing solvent: tetrahydrofuran
  Column oven temperature: 40° C.
  Flow rate: 1 mL/min
  Detector: refraction index (RI) detector
  Standards: monodisperse polystyrene (2) Proton nuclear magnetic resonance ($^1$H-NMR) spectrum analysis conditions
  Analyzer: AVANCE III 400 (BRUKER Corp.)
  Solvent: $CDCl_3$
  Internal standard: tetramethylsilane (TMS)

(3) Infrared spectroscopy (IR) conditions
  Analyzer: Nicolet 6700 (Thermo Fisher Scientific Inc.)

[1] Synthesis of poly(meth)acrylate Compound

Example 1

A 1-L flask was charged with 306 g (3 moles) of allyl glycol, 0.2 g of dibutylhydroxytoluene, 1.9 g of an ethanol solution of platinum-divinyltetramethyldisiloxane complex (platinum concentration 3%), and 150 g of isopropanol, which were heated and stirred at 75° C. in a nitrogen atmosphere. Then, 194 g (1 mole) of 1,4-bis(dimethylsilyl) benzene was added dropwise to the mixture over one hour. After the dropwise addition, the reaction was run at 75° C., followed by concentration at 80° C. under a vacuum of 5 mmHg for 2 hours. Toluene, 250 g, was added to the resulting solution, which was thoroughly stirred and washed with three divided portions of 450 g of 10% sodium chloride aqueous solution. The upper layer was distilled at 80° C. under a vacuum of 5 mmHg for 3 hours, yielding 356 g of a colorless clear liquid.

From the data of GPC, $^1$H-NMR, and IR, the liquid was identified to be compound (B1) having the following formula (2-1).

[Chem. 17]

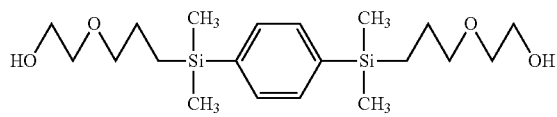

(2-1)

Subsequently, a 1-L flask was charged with 298 g (0.75 mole) of the resulting compound (B1), 298 g of ethyl acetate, 0.2 g of dibutylhydroxytoluene, and 0.1 g of dioctyltin oxide, which were heated and stirred at 80° C. in a 4% oxygen-nitrogen atmosphere. Then, 222 g (1.57 moles) of 2-acryloyloxyethyl isocyanate (Karenz AOI, Showa Denko K.K.) was added dropwise to the mixture, after which the reaction was run at 80° C. for 5 hours. The reaction mixture was cooled to room temperature, after which it was analyzed by IR, finding that the absorption peak (2,260 cm$^{-1}$) assigned to NCO substantially disappeared. The consumption of the reactant Karenz AOI was confirmed. The reaction mixture was filtered through a paper filter, obtaining 720 g of a colorless clear liquid having a viscosity of 18.7 mm$^2$/s, a refractive index of 1.4597, and a nonvolatile content of 68%. From the data of GPC, $^1$H-NMR, and IR, the liquid was identified to be an ethyl acetate solution of compound ($C_1$) having the following formula (3-1).

[Chem. 18]

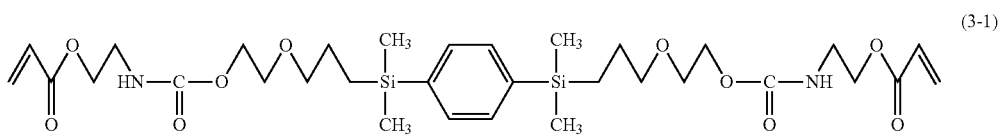

(3-1)

Example 2

A 1-L flask was charged with 80 g (0.2 mole) of compound (B1) in Example 1, 90 g of ethyl acetate, 0.1 g of dibutylhydroxytoluene, 0.3 g of diazabicycloundecene, and 0.05 g of dioctyltin oxide, which were heated and stirred at 80° C. in a 4% oxygen-nitrogen atmosphere. Then, 100 g (0.42 mole) of 1,1-bis(acryloyloxymethyl)ethyl isocyanate (Karenz BEI, Showa Denko K.K.) was added dropwise to the mixture, after which the reaction was run at 80° C. for 7 hours. The reaction mixture was cooled to room temperature, after which it was analyzed by IR, finding that the absorption peak (2,260 cm$^{-1}$) assigned to NCO substantially disappeared. The consumption of the reactant Karenz BEI was confirmed. Then, 1.5 g of Kyoward 700 (Kyowa Chemical Industry Co., Ltd.) was added to the mixture, which was stirred at room temperature overnight. The residue was filtered off, leaving 168 g of a pale yellow clear liquid having a viscosity of 30.1 mm$^2$/s, a refractive index of 1.4604, and a nonvolatile content of 72%. From the data of GPC, $^1$H-NMR, and IR, the liquid was identified to be an ethyl acetate solution of compound (C2) having the following formula (3-2).

[Chem. 19]

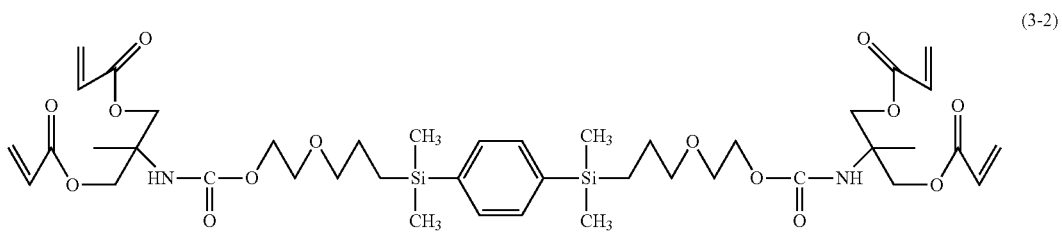

(3-2)

Example 3

A 1-L flask was charged with 120 g (1 mole) of vinyl norbornene (substantially equimolar mixture of isomers 5-vinylbicyclo[2.2.1]hept-2-ene and 6-vinylbicyclo[2.2.1]hept-2-ene, Tokyo Chemical Industry Co., Ltd.) and 35 g of toluene, which were heated and stirred at 85° C. in a nitrogen atmosphere. To the mixture was added 0.5 g of 5% platinum metal-on-carbon powder. With stirring, 330 g (1.7 moles) of 1,4-bis(dimethylsilyl)benzene was added dropwise to the mixture, which was stirred at 110° C. for another 5 hours and then cooled to room temperature. Thereafter, the mixture was filtered to separate the platinum metal-on-carbon, distilled at 100° C. under a vacuum of 5 mmHg for 3 hours, and cooled to room temperature. There was obtained 425 g of a colorless clear viscous liquid having a viscosity of 9,270 mPa·s. From the data of GPC, $^1$H-NMR, and IR, the liquid was identified to be a mixture (A1) of compounds having the following formula (1-1), specifically 38 mol % of a compound wherein n1=1, 48 mol % of a compound wherein n1=2, and 14 mol % of a compound wherein n1=3. The content of Si—H groups was 0.27 mole per 100 g of the entire mixture.

[Chem. 20]

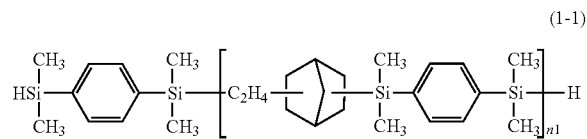

(1-1)

Subsequently, reaction was performed as in the first half of Example 1 except that 385 g of compound (A1) was used instead of 1,4-bis(dimethylsilyl)benzene, yielding 566 g of a colorless clear viscous liquid. From the data of GPC, $^1$H-NMR, and IR, the liquid was identified to be a mixture (B2) of compounds having the following formula (2-2) wherein average n1=1.7. The content of OH groups was 0.21 mole per 100 g of the entire mixture.

[Chem. 21]

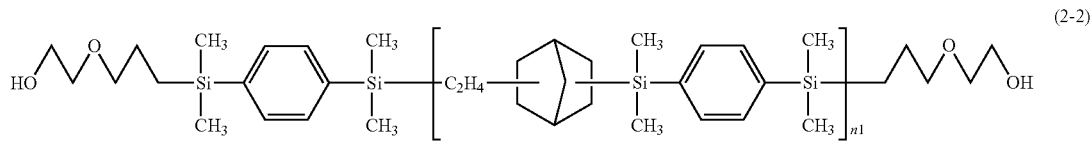

(2-2)

Subsequently, reaction was performed as in Example 2 except that 94 g of mixture (B2) was used instead of compound (B1), yielding 176 g of a pale yellow clear viscous liquid. From the data of GPC, $^1$H-NMR, and IR, the liquid was identified to be a mixture ($C_3$) of compounds having the following formula (3-5) wherein average n1=1.7.

[Chem. 22]

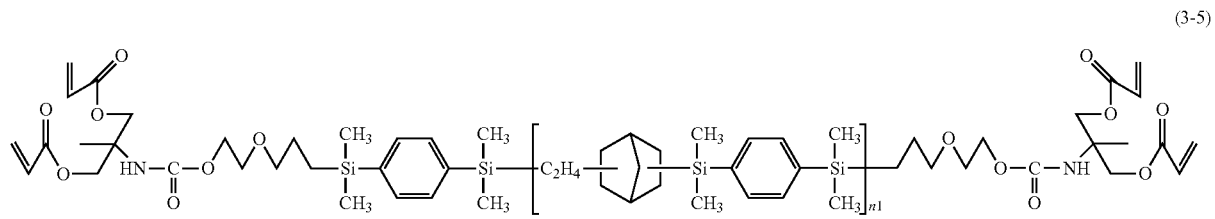

(3-5)

[Reference Example 1] Hydrolytic Condensate of Acrylsilane 142 parts of acryloyloxypropyltrimethoxysilane (trade name KBM-5103 by Shin-Etsu Chemical Co., Ltd.), 500 parts of isopropyl alcohol, 0.1 part of methoquinone, 1.0 part of tetramethylammonium hydroxide and 20 parts of deionized water were combined and reacted at 20° C. for 24 hours, yielding a colorless clear liquid. The liquid was concentrated by vacuum distillation. There was obtained a hydrolytic condensate of acrylsilane (5103SQ) as a colorless clear liquid. It had a nonvolatile content of 99.3% and a weight average molecular weight of 1,900.

[Reference Example 2] Colloidal Silica Surface-Treated with Acrylsilane

A mixture of 2.8 parts of acryloyloxypropyltrimethoxysilane (trade name KBM-5103 by Shin-Etsu Chemical Co., Ltd.), 95.6 parts (solids 27.4 parts) of methyl ethyl ketone silica sol (trade name MEK-ST by Nissan Chemical Industries, Ltd., number average particle diameter 45 nm, silica concentration 30%), and 0.1 part of ion exchanged water was stirred at 80° C. for 3 hours. To the mixture was added 1.4 parts of methyl orthoformate. The mixture was stirred and heated at the temperature for another hour, forming a dispersion of surface-treated silica particles. The solid content measured 32%. The silica particles had an average particle diameter of 45 nm.

Reference Example 3

SPHEA, the reaction product between 1,4-bis(dimethylchlorosilyl)benzene and 2-hydroxyethyl acrylate was synthesized by the method described in Example 6 of JP-A 2003-327626, the SPHEA having the following formula.

[Chem. 23]

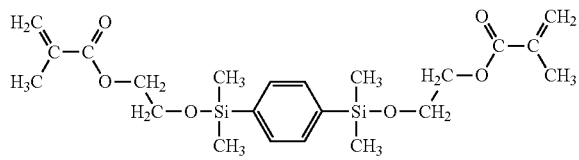

Reference Example 4

SPAMA, the reaction product between 1,4-bis(dimethylchlorosilyl)benzene and 3-(acryloyloxy)-2-hydroxypropyl methacrylate was synthesized by the method described in Example 3 of JP-A 2003-327626, the SPAMA having the following formula.

[Chem. 24]

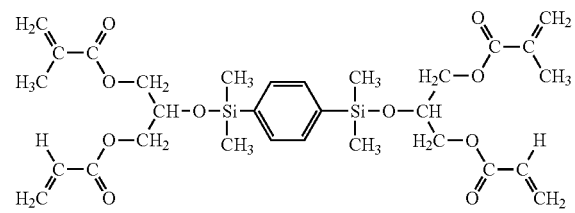

[2] Preparation of Coating Composition

Example 4

A photo-curable coating composition (D1) was prepared by blending 8.6 parts of compound ($C_1$) obtained in Example 1, 4 parts of dipentaerythritol penta- and hexa-acrylates (Aronix M403, Toagosei Co., Ltd.), 2.5 parts of 1,6-hexanediol diacrylate (HDDA, Daicel Cytec Co., Ltd.), 0.23 part of 1-hydroxycyclohexyl phenyl ketone (IRGACURE 184, BASF) as polymerization initiator, 0.23 part of 2,4,6-trimethylbenzoyldiphenylphosphine oxide (LUCIRIN TPO, BASF) as polymerization initiator, 0.02 part of polyether-modified silicone (KP341, Shin-Etsu Chemical Co., Ltd.) as leveling agent, 2.5 parts of a triazine base UV absorber (TINUVIN 400, BASF) as UV absorber, and 17.4 parts of propylene glycol monomethyl ether as solvent.

Examples 5 to 13 and Comparative Examples 1 to 6

Coating compositions (D2 to D10 and R1 to R6) were prepared in accordance with the formulation shown in Tables 1 and 2 and the same procedure as in Example 4, using the compounds of Examples 1 to 3 and the compounds of Reference Examples. A test piece was prepared by flow coating the coating composition on a surface of a polycarbonate sheet of 15 cm long×10 cm wide×4 mm thick (NF-2000, Mitsubishi Engineering-Plastics Corp.). The coating was air dried for 5 minutes and heated at 80° C. for 1 minute before it was cured by exposure to a high-pressure mercury lamp in an exposure dose of 600 mJ/cm$^2$.

The coatings obtained in Examples and Comparative Examples were evaluated by the following methods, with the results shown in Table 1.

(1) Appearance of Coating

The coating was visually observed and rated according to the following criterion.

○: intact

Δ: colored

X: anomalies such as foreign matter, unevenness or whitening (2) Initial Haze

The coated sheet was measured for haze by a haze meter NDH 5000SP (Nippon Denshoku Industries Co., Ltd.) and reported as initial haze.

(3) Mar Resistance

Using a Taber abrader equipped with abrasive wheels CS-10F, the test piece was rotated under a load of 500 g according to ASTM 1044. After 500 cycles, haze was measured. The difference of haze before and after the test is reported as mar resistance.

(4) Initial Adhesion

Adhesion was analyzed according to JIS K-5600, specifically by scribing the test piece with a razor along 6 longitudinal and 6 transverse lines at a spacing of 2 mm to define 25 square sections, tightly attaching a strip of Cellotape® (Nichiban Co., Ltd.) thereto, rapidly pulling back the adhesive tape at an angle of 90°, and counting the number (X) of coating sections kept unpeeled. The result is expressed as X/25.

(5) Adhesion after Boiling

The test piece was immersed in boiling water for 2 hours, after which it was evaluated as in the initial adhesion test.

(6) Weathering Test

Using an Eye Super UV Tester W-151 by Iwasaki Electric Co., Ltd., a weathering test was carried out. One cycle consisted of 5 hour holding at black panel temperature 63° C., relative humidity 50%, illuminance 50 mW/cm$^2$, and raining 10 seconds/hour, and 1 hour holding at black panel temperature 30° C. and relative humidity 95%. The weather cycles were repeated for 100 hours, 200 hours, and 300 hours. After the test, the coating was observed with naked eyes and under a microscope (×250) and rated according to the following criterion.

○: intact

Δ: some anomalies (cracks, whitening or local peel)

X: cracks, whitening or peel over entire coating surface

The degree of yellowing was measured after each period of time using a colorimeter 300A (Nippon Denshoku Industries Co., Ltd.). The difference from the initial value is reported as a change of yellowness index (ΔYI).

TABLE 1

| | | Example | | | | | | | | | |
|---|---|---|---|---|---|---|---|---|---|---|---|
| | | 4 | 5 | 6 | 7 | 8 | 9 | 10 | 11 | 12 | 13 |
| <Formulation> | | D1 | D2 | D3 | D4 | D5 | D6 | D7 | D8 | D9 | D10 |
| Inventive | C1 | 8.6 | 2.9 | 8.6 | 2.9 | | | | | | |
| acrylate | C2 | | | | | 8.6 | 2.9 | | | | |
| | C3 | | | | | | | 8.6 | 5.7 | 8.6 | 8.6 |
| Other | A-M403 | 4 | 8 | 4 | 8 | 4 | 8 | | | | |
| acrylates | HDDA | 2.5 | 2.5 | 2.5 | 2.5 | 2.5 | 2.5 | 2.5 | 2.5 | 2.5 | 2.5 |
| | U-4HA | | | | | | | 4 | 6 | 2 | |
| | 5103SQ | | | | | | | | | 2 | 4 |
| Photo- | I184 | 0.23 | 0.23 | 0.23 | 0.23 | 0.23 | 0.23 | 0.23 | 0.23 | 0.23 | 0.23 |
| polymerization | L-TPO | 0.23 | 0.23 | 0.23 | 0.23 | 0.23 | 0.23 | 0.23 | 0.23 | 0.23 | 0.23 |
| initiator | | | | | | | | | | | |
| Additive | KP341 | 0.02 | 0.02 | 0.02 | 0.02 | 0.02 | 0.02 | 0.02 | 0.02 | 0.02 | 0.02 |
| | Silica | | | 2 | 2 | 2 | 2 | 2 | 2 | 2 | 4 |
| | T400 | 2.5 | 2.5 | 2.5 | 2.5 | 2.5 | 2.5 | 2.5 | 2.5 | 3 | 4 |
| Solvent | PGM | 17.4 | 19.1 | 17.4 | 19.1 | 17.4 | 19.1 | 17.4 | 18.3 | 17.4 | 14.4 |
| Total | | 35.48 | 35.48 | 37.48 | 37.48 | 37.48 | 37.48 | 37.48 | 37.48 | 37.98 | 37.98 |
| <Coating evaluation> | | | | | | | | | | | |
| Appearance | | ○ | ○ | ○ | ○ | ○ | ○ | ○ | ○ | ○ | ○ |
| Initial haze | | 0.96 | 1.03 | 0.92 | 1.01 | 0.88 | 0.88 | 0.79 | 0.82 | 0.84 | 0.94 |
| Mar resistance | | 19.2 | 10.9 | 10.8 | 5.5 | 6.2 | 5.1 | 8.4 | 6.7 | 9.2 | 7.2 |
| Initial adhesion | | 25 | 25 | 25 | 25 | 25 | 25 | 25 | 25 | 25 | 25 |
| Adhesion after boiling | | 25 | 25 | 25 | 25 | 25 | 25 | 25 | 25 | 25 | 25 |
| Weathering 100 hr | Appearance | ○ | ○ | ○ | ○ | ○ | ○ | ○ | ○ | ○ | ○ |
| test | ΔYI | 2.7 | 3.9 | 2.4 | 4.4 | 1.6 | 2.9 | 2.0 | 2.7 | 1.8 | 1.5 |

TABLE 1-continued

|  |  | Example | | | | | | | | | |
|---|---|---|---|---|---|---|---|---|---|---|---|
|  |  | 4 | 5 | 6 | 7 | 8 | 9 | 10 | 11 | 12 | 13 |
| 200 hr | Appearance | ○ | Δ whitened | ○ | Δ whitened | ○ | Δ whitened | ○ | ○ | ○ | ○ |
|  | ΔYI | 4.2 | 6.0 | 2.7 | 4.9 | 1.8 | 5.8 | 2.6 | 3.1 | 2.2 | 2.1 |
| 300 hr | Appearance | ○ | X peeled | ○ | X peeled | ○ | Δ whitened | ○ | ○ | ○ | ○ |
|  | ΔYI | 4.3 | 8.7 | 2.8 | 5.9 | 2.1 | 6.0 | 2.8 | 3.3 | 2.6 | 2.3 |

TABLE 2

|  |  | Comparative Example | | | | | |
|---|---|---|---|---|---|---|---|
|  |  | 1 | 2 | 3 | 4 | 5 | 6 |
| <Formulation> |  | R1 | R2 | R3 | R4 | R5 | R6 |
| Other acrylates | SPHEA |  |  | 6 |  |  |  |
|  | SPAMA |  |  |  | 6 |  |  |
|  | BPADA |  |  |  |  | 6 |  |
|  | TCDDA |  |  |  |  |  | 6 |
|  | A-M403 | 10 | 5 | 4 | 4 | 4 | 4 |
|  | HDDA | 2.5 | 2.5 | 2.5 | 2.5 | 2.5 | 2.5 |
|  | U-4HA |  | 5 |  |  |  |  |
|  | 5103SQ |  |  |  |  |  |  |
| Photo-polymerization initiator | I184 | 0.23 | 0.23 | 0.23 | 0.23 | 0.23 | 0.23 |
|  | L-TPO | 0.23 | 0.23 | 0.23 | 0.23 | 0.23 | 0.23 |
| Additive | KP341 | 0.02 | 0.02 | 0.02 | 0.02 | 0.02 | 0.02 |
|  | Silica |  | 2 | 2 | 2 | 2 | 2 |
|  | T400 | 2.5 | 2.5 | 2.5 | 2.5 | 2.5 | 2.5 |
| Solvent | PGM | 20 | 20 | 20 | 20 | 20 | 20 |
| Total |  | 35.48 | 37.48 | 37.48 | 37.48 | 37.48 | 37.48 |
|  |  | <Coating evaluation> | | | | | |
| Appearance |  | ○ | ○ | ○ | ○ | ○ | ○ |
| Initial haze |  | 0.87 | 0.9 | 1.18 | 1.02 | 0.93 | 0.84 |
| Mar resistance |  | 4.8 | 5.4 | 11.1 | 8.4 | 14.5 | 12.8 |
| Initial adhesion |  | 25 | 25 | 25 | 25 | 25 | 25 |
| Adhesion after boiling |  | 25 | 25 | 17 | 20 | 25 | 25 |
| Weathering test | 100 hr | Appearance | X cracked | ○ | X peeled | X peeled | ○ | ○ |
|  |  | ΔYI | 2.9 | 2.5 | 3.1 | 3.5 | 9.2 | 2.8 |
|  | 200 hr | Appearance |  | X cracked |  |  | X cracked | X cracked |
|  |  | ΔYI |  | 3.1 |  |  | 8.4 | 3.6 |
|  | 300 hr | Appearance |  |  |  |  |  |  |
|  |  | ΔYI |  |  |  |  |  |  |

The abbreviations in Tables 1 and 2 have the following meaning.

Other Acrylates

SPHEA: reaction product of 1,4-bis(dimethylchlorosilyl)benzene and 2-hydroxyethyl acrylate, which was synthesized by the method described in Example 6 of JP-A 2003-327626 (see Reference Example 3)

SPAMA: reaction product of 1,4-bis(dimethylchlorosilyl)benzene and 3 (acryloyloxy) 2 hydroxypropyl methacrylate, which was synthesized by the method described in Example 3 of JP-A 2003-327626 (see Reference Example 4)

BPADA: bisphenol A ethoxylate diacrylate (trade name ABE-300 by Shin-Nakamura Chemical Co., Ltd.)

TCDDA: tricyclodecane dimethanol diacrylate (trade name A-DCP by Shin-Nakamura Chemical Co., Ltd.)

A-M403: dipentaerythritol penta- and hexa-acrylates (trade name Aronix M403 by Toagosei Co., Ltd.)

HDDA: 1,6-hexanediol diacrylate (trade name HDDA by Daicel Cytec Co., Ltd.)

U-4HA: non-yellowing urethane acrylate (trade name U-4HA by Shin-Nakamura Chemical Co., Ltd.)

5103SQ: hydrolytic condensate of 3-acryloxypropyltrimethoxysilane (trade name KBM-5103 by Shin-Etsu Chemical Co., Ltd.) (see Reference Example 1)

Photopolymerization Initiator

I184: 1-hydroxycyclohexyl phenyl ketone (trade name IRGACURE 184 by BASF)

L-TPO: 2,4,6-trimethylbenzoyldiphenylphosphine oxide (trade name LUCIRIN-TPO by BASF)

Additive

KP341: polyether-modified silicone (trade name KP341 by Shin-Etsu Chemical Co., Ltd.)

Silica: dispersion of silica particles surface treated with acryloyloxypropyltrimethoxysilane (trade name KBM-5103 by Shin-Etsu Chemical Co., Ltd.) (see Reference Example 2)

T400: hydroxyphenyl triazine base UV absorber (trade name TINUVIN 400 by BASF)

Solvent
PGM: propylene glycol monomethyl ether

Although the films (D1 to D4) of Examples 4 to 7 exhibited poor mar resistance as compared with the films (R1 and R2) of Comparative Examples 1 and 2 free of the inventive poly(meth)acrylate, they were significantly improved in weather resistance, especially weather crack resistance. Surprisingly, it is seen that as the amount of the inventive poly(meth)acrylate blended is larger, the change of yellowness index (ΔYI) after the weathering test is smaller.

The films (D3 and D4) of Examples 6 and 7 comprising surface-treated silica exhibited improved mar resistance while maintaining weather crack resistance.

The films (D5 and D6) of Examples 8 and 9 comprising the inventive poly(meth)acrylate with more (meth)acrylate functionality exhibited improved mar resistance while maintaining weather resistance as compared with the films (D3 and D4) of Examples 6 and 7 with less functionality. The films (D7 to D10) of Examples 10 to 13 showed a similar tendency.

On the other hand, the films (R3 and R4) of Comparative Examples 3 and 4 comprising another (meth)acrylic group-bearing silphenylene compound instead of the inventive (meth)acrylate maintained mar resistance substantially equivalent to the films (D3 and D5) of Examples 6 and 8, but was significantly inferior in adhesion after boiling and weather resistance to the films (D3 and D5). This is probably because in the other (meth)acrylic group-bearing silphenylene compound, the (meth)acryl-containing group is bonded to silicon of the silphenylene via oxygen to form a C—O—Si linkage, which is cleaved into the corresponding alcohol and silanol due to low hydrolysis resistance. It is believed that the inventive (meth)acrylate has a stable C—Si bond rather than such C—O—Si linkage and is thus resistant to hydrolysis.

The film (R5) of Comparative Example 5 comprising another (meth)acrylate having a phenylene skeleton marked a substantial increase of ΔYI (a change of yellowness index) just after 100 hours as compared with the films of Examples comprising the inventive poly(meth)acrylate. The film (R6) of Comparative Example 6 comprising another (meth)acrylate having a polycyclic structure showed a small change of yellowness index (ΔYI), but the weather crack resistance remained poor. These results demonstrate the benefits of the poly(meth)acrylate of the invention.

The invention claimed is:

1. A poly(meth)acrylate having the general formula (1):

$$(P)_b-(Q-T)_a-X-\underset{R^2}{\overset{R^1}{\underset{|}{Si}}}-\!\!\!\!\underset{}{\bigcirc}\!\!\!\!-\underset{R^4}{\overset{R^3}{\underset{|}{Si}}}-\left[Y-\underset{R^2}{\overset{R^1}{\underset{|}{Si}}}-\!\!\!\!\underset{}{\bigcirc}\!\!\!\!-\underset{R^4}{\overset{R^3}{\underset{|}{Si}}}\right]_n X-(T-Q)_c-(P)_d \quad (1)$$

wherein $R^1$ to $R^4$ are each independently hydrogen or a monovalent hydrocarbon group which may be separated by at least one atom selected from oxygen, nitrogen, sulfur, and phosphorus, Y is a divalent hydrocarbon group having a polycyclic structure, X is each independently a di- or trivalent saturated hydrocarbon group which may be separated by at least one atom selected from oxygen, nitrogen, sulfur, and phosphorus, T is a urethane group: —O—(C=O)—NH— wherein the oxygen bonds to X, Q is each independently a di- or trivalent saturated hydrocarbon group which may be separated by at least one atom selected from oxygen, nitrogen, sulfur, and phosphorus, P is a (meth)acryloyloxy group, a representative of the number of Q-T bonded to X is 1 when X is divalent, and 2 when X is trivalent, b representative of the number of (meth)acryloyloxy groups bonded to Q is 1 or 2 in case of a=1, and 2, 3 or 4 in case of a=2, c representative of the number of Q-T bonded to X is 1 when X is divalent, and 2 when X is trivalent, d representative of the number of (meth)acryloyloxy groups bonded to Q is 1 or 2 in case of c=1, and 2, 3 or 4 in case of c=2, and n is an integer of 1 to 6.

2. The poly(meth)acrylate of claim 1 wherein Y is a divalent saturated hydrocarbon group having a polycyclic structure.

3. The poly(meth)acrylate of claim 1 or 2 wherein Y is one or more groups selected from divalent saturated hydrocarbon groups having the following formulae (2a) to (2d):

(2a)

(2b)

(2c)

(2d)

4. The poly(meth)acrylate of claim 1 wherein X is each independently a group having the following formula (3) or (4):

(3)

(4)

wherein 1* bonds to the silicon in formula (1) and 2* bonds to the oxygen on the urethane group in formula (1).

5. The poly(meth)acrylate of claim 1 wherein Q is each independently a group having the following formula (5) or (6):

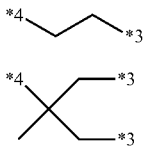

(5)

(6)

wherein 3* bonds to P in formula (1) and 4* bonds to the nitrogen on the urethane group in formula (1).

6. The poly(meth)acrylate of claim 4, wherein $R^1$ to $R^4$ are methyl, X is a group having formula (3), and a and c each are 1.

7. The poly(meth)acrylate of claim 1 wherein n is an integer of 1 to 3.

8. A method of preparing the poly(meth)acrylate of claim 1, comprising the steps of effecting addition reaction of a compound having two silicon-bonded hydrogen atoms per molecule, represented by the following formula (7):

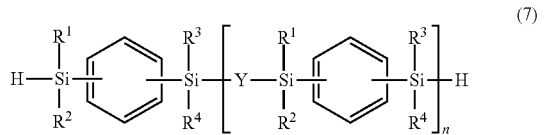

(7)

wherein $R^1$ to $R^4$, Y and n are as defined above, with a compound having one addition reactive carbon-carbon double bond per molecule and a hydroxyl group to form an addition reaction product having the following formula (8):

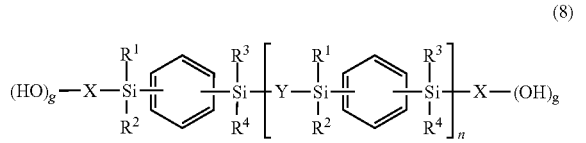

(8)

wherein $R^1$ to $R^4$, X, Y and n are as defined above and g is an integer of 1 or 2, and reacting the hydroxyl group on the addition reaction product with an isocyanate group on a compound having the following formula (9):

(9)

wherein Q and P are as defined above and h is an integer of 1 or 2.

9. A coating composition comprising the poly(meth)acrylate of claim 1 and a binder precursor other than the poly(meth)acrylate.

10. The coating composition of claim 9 wherein the binder precursor comprises at least one monofunctional or polyfunctional (meth)acrylate and at least one photopolymerization initiator.

11. The coating composition of claim 9 wherein the binder precursor contains at least one compound selected from the group consisting of urethane poly(meth)acrylates and hydrolyzates or hydrolytic condensates of (meth)acryloyl-containing alkoxysilanes.

12. The coating composition of claim 9, further comprising colloidal silica which is surface treated with a (meth) acrylic functional alkoxysilane.

13. The coating composition of claim 9, further comprising one or more additives selected from UV absorbers, antifouling agents, water repellents, hydrophilizing agents, leveling agents, colorants, pigments, adhesion promoters, IR absorbers, photostabilizers, curing catalysts, and metal oxide fine particles.

14. A coated article comprising a substrate and a cured film of the coating composition of claim 9 formed on the substrate directly or via at least one other layer.

15. The coated article of claim 14 wherein the substrate is an organic resin or wood.

* * * * *